No. 622,315. Patented Apr. 4, 1899.
L. WREEDE.
PHOTOGRAPHIC CAMERA.
(Application filed July 13, 1897.)
(No Model.)
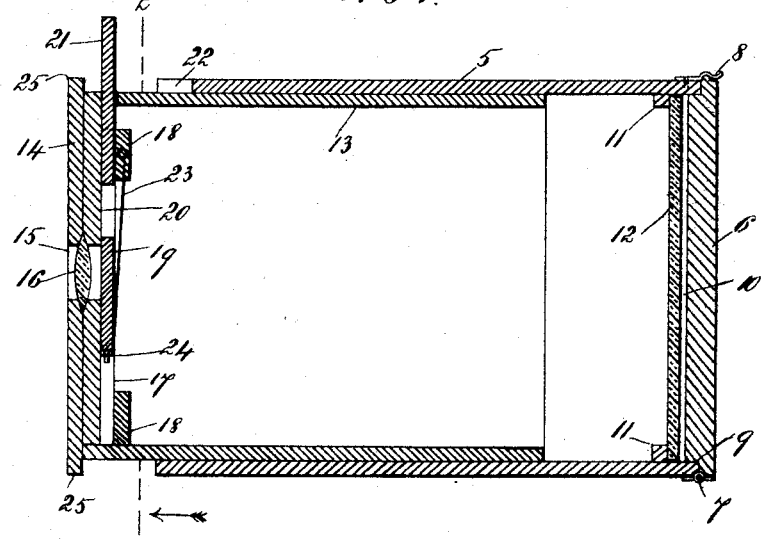
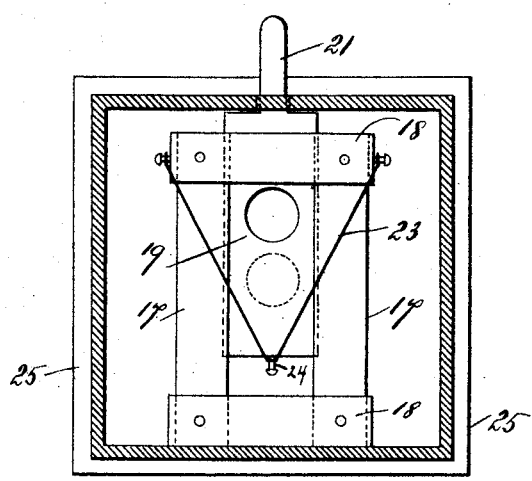
WITNESSES:
INVENTOR
Lynford Wreede
BY
Edgar Taletto
ATTORNEYS.

UNITED STATES PATENT OFFICE.

LYNFORD WREEDE, OF NEW YORK, N. Y.

PHOTOGRAPHIC CAMERA.

SPECIFICATION forming part of Letters Patent No. 622,315, dated April 4, 1899.

Application filed July 13, 1897. Serial No. 644,377. (No model.)

*To all whom it may concern:*

Be it known that I, LYNFORD WREEDE, a citizen of the United States, residing at New York, (Brooklyn,) in the county of Kings and State of New York, have invented certain new and useful Improvements in Cameras, of which the following is a full and complete specification, such as will enable those skilled in the art to which it appertains to make and use the same.

This invention relates to photographic cameras; and the object thereof is to provide an improved device of this class which is simple in construction and operation and which is provided with means for finding the proper focus before placing the film therein.

The invention is fully disclosed in the following specification, of which the accompanying drawings form a part, in which—

Figure 1 is a central vertical longitudinal section of my improved camera, and Fig. 2 a cross-section thereof on the line 2 2.

In the drawings forming part of this specification the separate parts of my improvement are designated by the same numerals of reference in each of the views, and in the practice of my invention I provide a camera which comprises an oblong rectangular casing 5, which is provided with an end 6, which is hinged to one side thereof, as shown at 7, and which is provided opposite said hinge with a spring-clasp 8, and the hinged end 6 is provided around the edge thereof with a rabbet-groove 9, whereby an inwardly-directed portion 10 is formed, which fits within the casing 5, and adjacent to said casing are strips or cleats 11, and I also provide a focusing-screen 12, which consists of a plate of glass which is preferably ground, so as to render it only partially transparent.

Mounted in the open end of the casing 5 is a supplemental casing 13, which is similar in form in cross-section to the casing 5 and which is adapted to slide therein, and the inner end of the casing 13 is open and the outer end provided with an end plate 14, and said end plate is preferably composed of two parts, and in the center thereof is a circular opening 15, in which is mounted a lens 16, and secured to the inner side of said end piece 14 are two vertical guides 17, which are arranged at the opposite sides of the lens 16, and across the upper and lower ends of the guides 17 are cross-plates 18, and mounted between the guides 17 is a vertically-movable plate 19, which is also provided with a central circular opening 20, which corresponds with that in which the lens 16 is mounted, and the vertically-movable plate 19 is provided with a handle 21, which projects through the top of the casing 13, and when the casing 13 is in its innermost position the handle 21 of the vertically-movable plate 19 passes through a notch or recess 22, formed in the top of the casing 5.

Secured to the opposite ends of the upper cross-plate 18 is an elastic cord 23, which is also connected with the lower end of the vertically-movable plate, as shown at 24.

The operation will be readily understood from the foregoing description when taken in connection with the accompanying drawings and the following statement thereof.

In operating the device so as to find the proper focus of the object which it is desired to photograph the hinged end 6 is lowered and the casing 13 is moved outwardly until the proper focus is found by looking through the plate 12, after which the said plate 12 is removed and the film placed in position in the usual manner in the place occupied by said plate. It will be understood that the opening in which the lens 16 is mounted is quickly closed by the vertically-movable plate 19, and whenever the apparatus is in condition, as above described, the plate 19 is depressed by means of the handle 21, so that the hole or opening 20 therein will register with the hole or opening in the end plate 14, in which the lens 16 is mounted. The elastic cord 23 operates as a spring to hold the plate 19 in the position shown in the drawings, so as to close the opening in which the lens 16 is mounted, and when said plate has been depressed, as described, by pressing on the handle 21 the elastic spring-cord 23 will at once return said plate to its normal position as soon as the pressure is removed therefrom, and thus close the opening 15.

The end plate 14 is provided with a flange or rim 25 around the edge thereof, which fits against the end of the casing 5 when the supplemental casing 13 is in its innermost position, and it will thus be seen that I accomplish the object of my invention by means of a device which is simple in construction and operation and which is also comparatively inexpensive.

Having fully described my invention, I claim as new and desire to secure by Letters Patent—

1. A camera, comprising a main outer casing which is open at one end and provided at the other with a hinged or detachable end piece, and also with a detachable focusing-screen consisting of a partially-transparent glass plate, a supplemental casing mounted in the open end of the main casing and adapted to slide therein, said supplemental casing being open at its inner end and closed at its outer end, the closed end of said supplemental casing being provided centrally with an opening in which a lens is mounted, and on the inner side thereof with vertical guide-plates on the opposite sides of said opening, and a sliding spring-operated plate mounted between said guide-plates and adapted to close said opening, said sliding spring-operated plate being provided at its upper end with a handle, substantially as shown and described.

2. As an improved article of manufacture, a camera comprising an oblong rectangular casing 5, provided with a hinged end 6, having a rabbet-groove 9, whereby an inwardly-directed portion 10, is formed adapted to fit within the casing 5, cleats 11, secured to said casing 5, a focusing-screen 12 consisting of a plate glass mounted in said cleats, a supplemental casing 13, similar in form in cross-section to the casing 5, and adapted to slidably fit therein, the inner end of said casing 13 being open, the outer end being provided with an end plate 14 composed of two parts having a circular opening 15 in which is mounted a lens 16, and a slide mounted in the rear of said lens and provided with an opening adapted to register with the opening in the end of said supplemental casing and means for projecting the slide across said opening, substantially as and for the purpose described.

In testimony that I claim the foregoing as my invention I have signed my name, in presence of the subscribing witnesses, this 12th day of July, 1897.

LYNFORD WREEDE.

Witnesses:
C. GERST,
A. C. McLOUGHLIN.